United States Patent [19]

Harrington et al.

[11] Patent Number: 4,973,113
[45] Date of Patent: Nov. 27, 1990

[54] METHOD AND APPARATUS FOR MAKING TRANSMISSION HOLOGRAMS

[75] Inventors: Albert F. Harrington, Claymont; Robert R. Krebs, Hockessin, both of Del.

[73] Assignee: E. I. Du Pont de Nemours and Company, Wilmington, Del.

[21] Appl. No.: 341,071

[22] Filed: Apr. 20, 1989

[51] Int. Cl.$^5$ ............................................. G03H 1/20
[52] U.S. Cl. .................................. 350/3.65; 350/3.69
[58] Field of Search ........................ 350/3.6, 3.65, 3.69

[56] References Cited

U.S. PATENT DOCUMENTS

| | | |
|---|---|---|
| 3,506,327 | 4/1970 | Leith et al. |
| 3,658,526 | 4/1972 | Haugh ..................................... 96/27 |
| 3,716,286 | 2/1973 | St. John et al. |
| 3,758,186 | 9/1973 | Brumm . |
| 3,838,903 | 10/1974 | Leith et al. |
| 3,894,787 | 7/1975 | Leith et al. |
| 4,209,250 | 6/1980 | James et al. ............................ 355/18 |
| 4,339,168 | 7/1982 | Haines ................................. 350/3.65 |
| 4,411,489 | 10/1983 | McGrew ............................. 350/3.69 |
| 4,416,540 | 11/1983 | Nicholson ........................... 350/3.69 |
| 4,715,670 | 12/1987 | Turukhano .......................... 350/3.69 |

FOREIGN PATENT DOCUMENTS 1030793 5/1978 Canada .

OTHER PUBLICATIONS

"Holography," Encyclopedia of Physical Science and Technology, vol. 6, pp. 507–519, 1987.
"Photography by Laser," Scientific American, vol. 212, No. 6, pp. 20 and 24–35, Jun. 1965.
"Volume Holography and Volume Gratings," Academic Press, Inc., Chapter 10, pp. 254–304, 1981.

Primary Examiner—Bruce Y. Arnold
Assistant Examiner—J. P. Ryan
Attorney, Agent, or Firm—John E. Griffiths

[57] ABSTRACT

This invention relates to a method and apparatus for making transmission holograms and, more specifically, using a rotatable drum adapted to receive a beam of actinic radiation on a reflector in the drum reflecting a portion of the beam through a master to a recording medium to form the transmission hologram in the recording medium.

12 Claims, 5 Drawing Sheets

METHOD AND APPARATUS FOR MAKING TRANSMISSION HOLOGRAMS

BACKGROUND OF THE INVENTION

1. Field of the Invention

This invention relates to a method and apparatus for making transmission holograms and, more specifically, using a rotatable drum adapted to receive a beam of actinic radiation on a reflector in the drum reflecting a portion of the beam through a master to a recording medium to form the transmission hologram in the recording medium.

2. Description of Related Art.

Holography is a form of optical information storage. The general principles are described in a number of references, e.g., "Photography by Laser" by E. N. Leith and J. Upatnieks in *Scientific American*, 212, No. 6, pages 24-35 (June, 1965). A useful discussion of holography is presented in "Holography", by C. C. Guest, in *Encyclopedia of Physical Science and Technology*, Vol. 6, pages 507-519, R. A. Meyers, Ed., Academic Press, Orlando, Florida, 1987.

In brief, the object to be photographed or imaged is illuminated with substantially monochromatic light (e.g., from a laser) and a light sensitive recording medium (e.g., a photographic plate) is positioned so as to receive light reflected from the object. This beam of reflected light is known as the object beam. At the same time, a portion of the coherent light is directed to the recording medium, bypassing the object. This beam is known as the reference beam. The interference pattern that results from the interation of the reference beam and the object beam impinging on the recording medium is recorded in the recording medium. When the processed recording medium is subsequently appropriately illuminated and observed at the appropriate angle, the light from the illuminating source is diffracted by the hologram to reconstruct the wavefront that originally reached the recording medium from the object. Thus, the hologram resembles a window through which the real or virtual image of the object is observed in full three-dimensional form.

Holograms formed by allowing the reference and object beams to enter the recording medium from opposite sides are known as reflection holograms. Interaction of the object and reference beams in the recording medium forms fringes of material with varying refractive indices which are, approximately, planes parallel to the plane of the recording medium. When the hologram is played back these fringes act as partial mirrors reflecting incident light back to the viewer. Hence, the hologram is viewed in reflection rather than in transmission.

Holograms that are formed by allowing the reference and object beams to enter the recording medium from the same side are known as transmission holograms. Interaction of the object and reference beams in the recording medium forms fringes of material with varying refractive indices which are approximately normal to the plane of the recording medium. When the hologram is played back by viewing with transmitted light, these fringes refract the light to produce the viewed virtual image. Such transmission holograms may be produced by methods which are well known in the art, such as disclosed in Leith and Upatnieks, U.S. Pat. Nos. 3,506,327; 3,838,903 and U.S. Pat. No. 3,894,787.

The present invention is directed to a method and apparatus for making a transmission hologram.

SUMMARY OF THE INVENTION

This invention relates to an apparatus for use in making transmission holograms comprising:

a first drum comprising a cylindrical wall having a longitudinal axis, an open end and a first window;

means positioned inside the drum for reflecting a beam of actinic radiation that is directed into the drum through the open end to pass the beam through the window;

a master positioned near the window; and a holographic recording medium positioned in fixed relation with respect to the master such that the light reflected by the reflecting means passes through the master and then the recording medium.

This invention further relates to a method of making transmission holograms comprising the steps of:

securing a master near a window in a cylindrical wall of a drum;

positioning a portion of a holographic recording medium partially around the cylindrical wall;

rotating the cylindrical wall about a longitudinal axis while transporting the recording medium such that as the window rotates the master comes in non sliding contact with the recording medium; and directing a reference beam of actinic radiation towards a reflector at least partially inside the drum to reflect at least a portion of the beam through the window and the master to expose the recording medium.

BRIEF DESCRIPTION OF THE DRAWINGS

The invention can be more fully understood from the following detailed description thereof in connection with accompanying drawings which form a part of this application and in which:

FIG. 6 is a cross sectional view of the drum assembly of FIG. 3 taken along section lines 6—6 therein and looking in the direction of the arrows.

DESCRIPTION OF THE PREFERRED EMBODIMENT(S)

Figure 1:
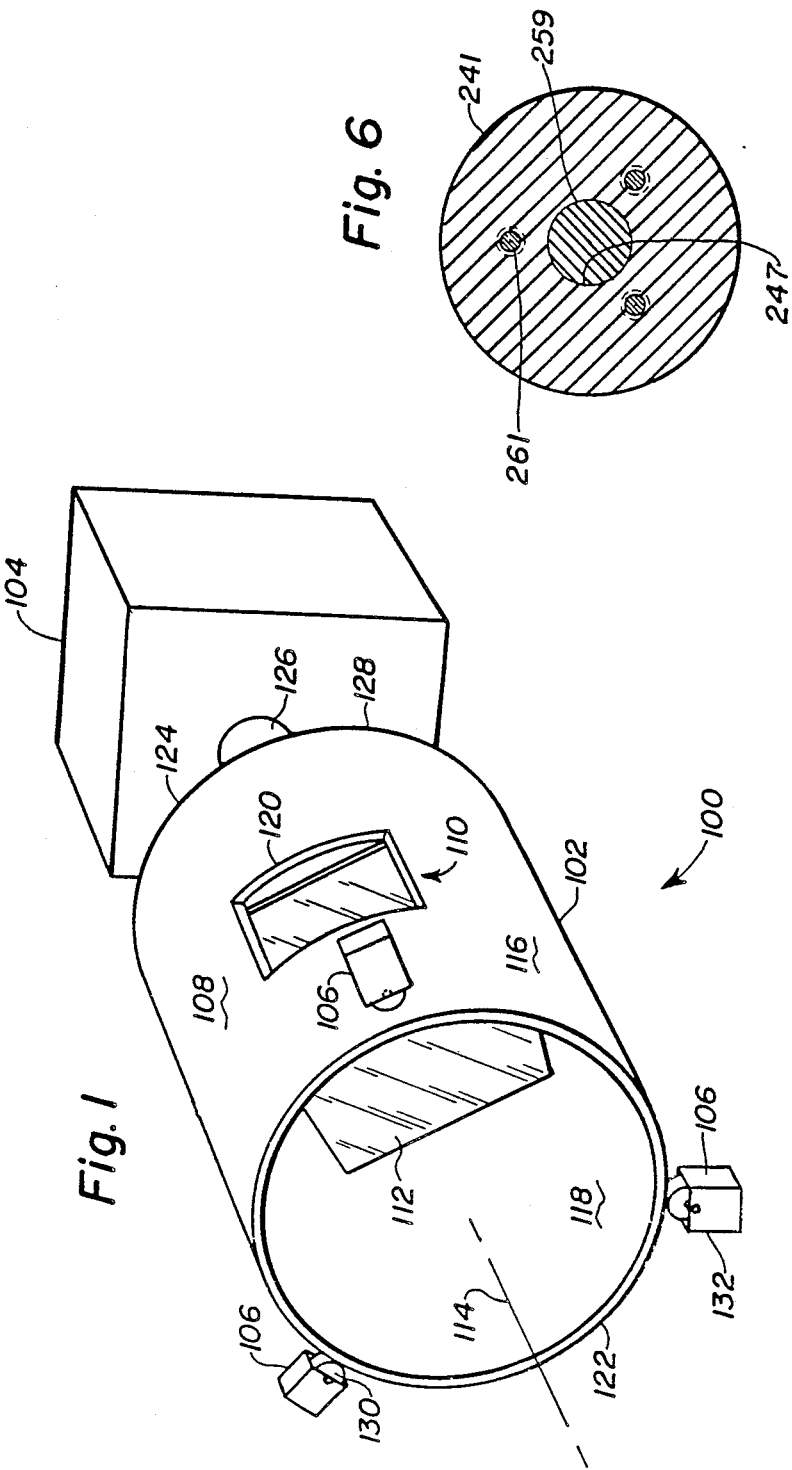
FIG. 1 is a perspective view of a first embodiment of apparatus for making transmission holograms in accordance with the present invention.

Throughout the following detailed description, similar reference numerals refer to similar elements in all Figures of the drawings.

Referring to FIG. 1, there is illustrated a first embodiment of apparatus 100 for making transmission holograms in accordance with the present invention. The apparatus comprises a drum assembly 102 and means 104 connected to one end of the drum assembly 102 for rotating the drum assembly 102. In a preferred embodiment, means 106 for rotatably supporting the other end of the drum assembly 102 is provided.

More specifically, the drum assembly 102 comprises a drum having a cylindrical wall 108 and a reflector or means for reflecting 112. The cylindrical wall 108 has a longitudinal axis 114, an outer surface 116 and an inner surface 118. The cylindrical wall 108 further has a window 110 that can be a mere opening through the wall 108, but preferably comprises a transparent material, such as glass, shaped to have an outer cylindrical surface 120 which substantially completes a cylinder with the outer surface 116 of the wall 108. One end 122 of the cylindrical wall 108 is open allowing a beam of actinic radiation to be directed into the cylindrical wall 108 generally along its longitudinal axis 114. The other end 124 of the cylindrical wall 108 can optionally be closed with an end wall 128. The reflector 112 is mounted inside the cylindrical wall 108 on the inner surface 118 and/or the end wall 128. The reflector 112 is positioned such that a beam of actinic radiation directed into the open end 122 of the cylindrical wall 108 generally along its longitudinal axis 114 will reflect off the reflector 112 to pass through the window 110 at a predetermined angle.

Any means 104 can be used for rotating the drum assembly 102. One illustrative means 104 is by a variable speed motor 104 connected to the drum assembly 102 by a shaft 126 rotatable by the motor 104. The shaft 126 can be connected to the end wall 128 and/or the cylindrical wall 108 as long as the motor 104 rotates the drum assembly 102 about the longitudinal axis 114.

Any means 106 can be used for rotatably supporting the open end 122 of the drum assembly 102. For instance, FIG. 1 depicts three wheel assemblies 106 equally spaced around the outer surface 116 of the cylindrical wall 108. Each one of the wheel assemblies 106 can comprise a wheel 130 contacting the outer surface 116 of the cylindrical wall 108. The wheels 130 are positioned to permit substantially frictionless rotation of the drum assembly 102. The wheels 130 are rotatably mounted in one or more relatively immovable supports 132 which prevent radial movement of the drum assembly 102.

In operation, the apparatus 100 for making transmission holograms can be used as follows.

First, a master (not illustrated in FIG. 1) is positioned or secured near the window 110. The master can be placed on either side of the window 110, either inside or outside the drum assembly 102. The master can be in the shape of a flexible film affixed to the cylindrical wall 108 on either side of the window 110, such as by tape. The master must be made of at least a partially transparent material. Preferably, the master comprises a transmission hologram.

Second, a portion of a holographic recording medium (not illustrated in FIG. 1) is positioned partially around the cylindrical wall 108. The recording medium is positioned in fixed relation with respect to the master such that the light reflected by the reflecting means passes through the master and then the recording medium. The holographic recording medium can be made of a variety of materials. Among the more important are: silver halide emulsions, hardened dichromated gelatin, ferroelectric crystals, photopolymers, photochromics and photodichroics. Characteristics of these materials are given in *Volume Holography and Volume Gratings*, by L. Solymar and D. J. Cook, Chapter 10, Acdemic Press, N.Y., 1981, pages 254–304. The recording medium is preferably a silver halide emulsion or a film made of a photohardenable composition which upon exposure to actinic radiation forms crosslinks or polymers of higher molecular weight to change the refractive index and rhelogical character of the composition. Preferred photohardenable compositions are photopolymerizable compositions, such as disclosed in U.S. Pat. No. 3,658,526 and more preferred materials are described in commonly assigned copending U.S. application Ser. No. 07/144,355, now U.S. Pat. No. 4,942,112, and U.S. application Ser. No. 07/144,840, now abandoned both filed on Jan. 14, 1988, and Ser. No. 07/288,916 filed on Dec. 23, 1988, all of which are incorporated herein by reference. The photohardenable film can have a protective film, such as a sheet of polyethylene terephthalate (e.g., Mylar ®), on both sides of it.

Third, the rotating means 104 rotates the drum assembly 102 about its longitudinal axis 114 while transporting the recording medium portion such that as the drum assembly 102 rotates, the recording medium is in non-sliding relationship with the master and covers the master or window 110 once each revolution of the drum assembly 102. Preferably, the recording medium remains in non-sliding relationship with the master and covers the master or window 110 for at least about 90° revolution of the drum assembly 102 and, more preferably, for about 180° revolution of the the drum assembly 102.

Fourth, a beam of actinic radiation is directed through the open end 122 of the cylindrical wall 108 substantially along its longitudinal axis 114 towards the reflector 112 to reflect at least a portion of the beam through the window 110, the master and the recording medium once each revolution of the drum assembly 102 to expose the recording medium. The beam remains "on" and the recording medium remains in non-sliding relationship with the master and covers the master or window 110 until a hologram is made in the recording medium. A source (not illustrated in FIG. 1) for emitting the beam preferably emits a beam of substantially monochromatic actinic radiation, such as a laser. Preferably, the laser emits a beam of light having a circular cross section that is substantially collimated, coherent, monochromatic and polarized. The choice of laser depends on the wavelength to which the recording medium has been sensitized.

Figure 2:
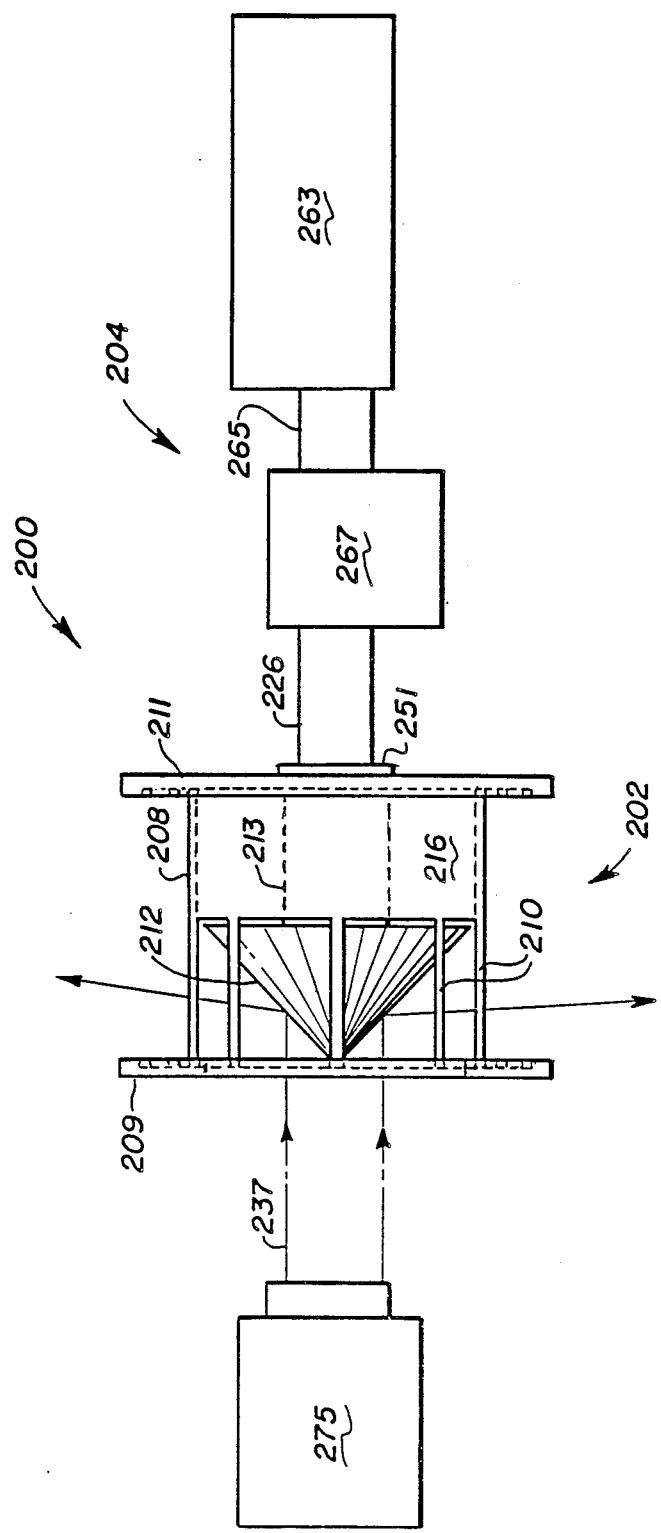
FIG. 2 is a side view of a second embodiment of apparatus for making transmission holograms in accordance with the present invention.
Figure 3:
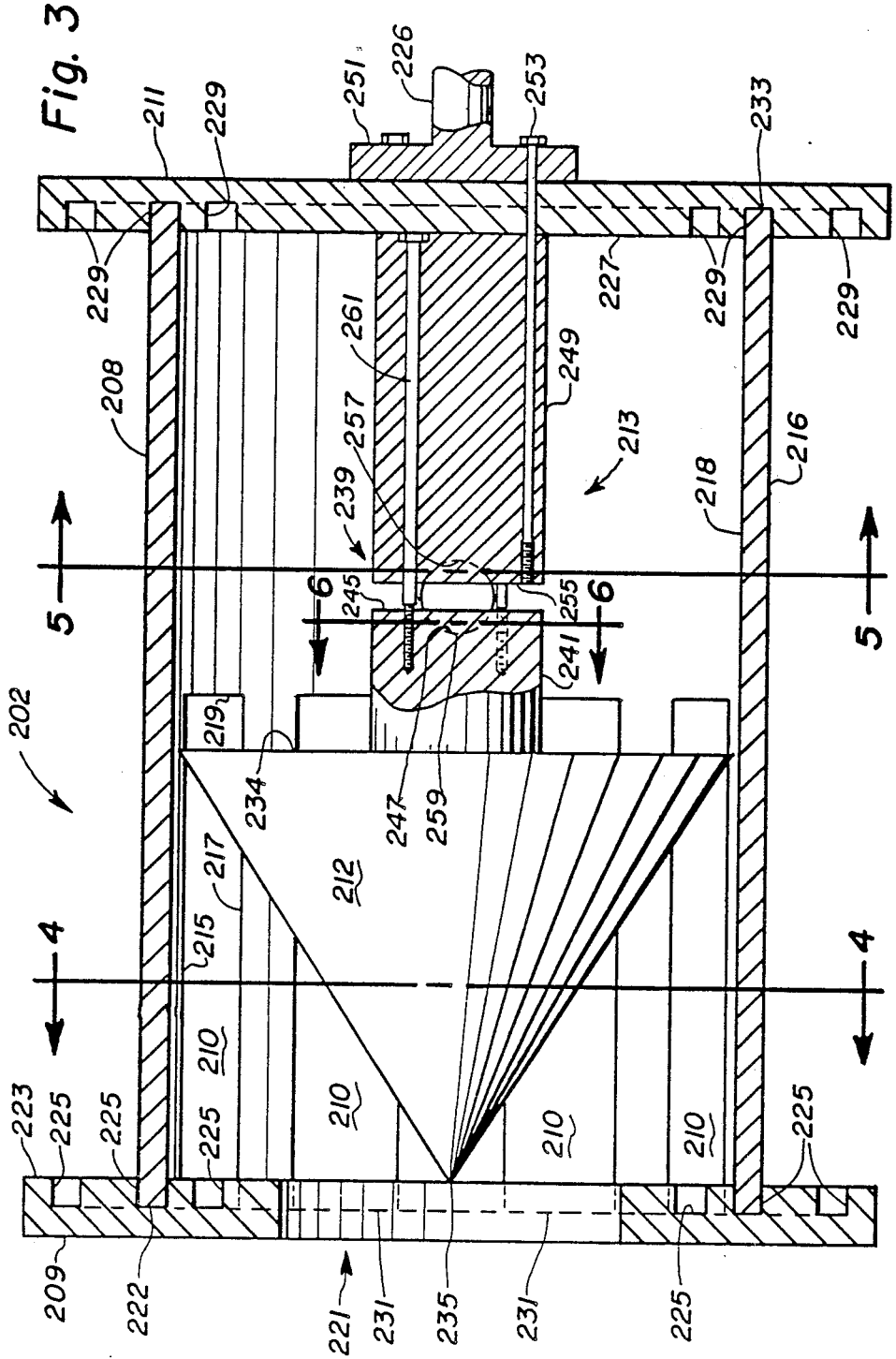
FIG. 3 is an enlarged cross sectional view of a drum assembly of the present invention.

Referring to FIG. 2, there is illustrated a side view of a second embodiment of apparatus 200 for making transmission holograms in accordance with the present invention, in which parts corresponding to those in FIG. 1 are increased by 100. In this embodiment, the apparatus 200 similarly comprises a drum assembly 202 and means 204 connected to one end of the drum assembly 202 for rotating the drum assembly 202.

Referring to FIGS. 2–6, the drum assembly 202 comprises a cylindrical wall 208, a front end plate 209, a rear end plate 211, a reflector 212 and means 213 for mounting the reflector. The cylindrical wall 208 has a plurality of windows 210 positioned on a circular line about the circumference of the cylindrical wall 208. The windows 210 can be mere openings through the wall 208, but preferably comprises a transparent material, such as glass, shaped to have outer cylindrical surfaces which substantially complete a cylinder with the outer surface 216 of the wall 208. In a preferred embodiment, these windows 210 are bordered by first 215, second 217 and third 219 radial walls and extend about half the longitudinal length of the cylindrical wall 208 to a front end 222 of the cylindrical wall 208.

The front end plate 209 can be disk shaped having a circular hole 221 in the middle for allowing the beam of actinic radiation into the drum assembly 202. A rear side 223 of the front end plate 209 has annular or ring shaped grooves 225 concentricly about, and positioned at different distances from, the hole 221. A front side 227 of the rear end plate 211 has a corresponding set of annular or ring shaped grooves 229. The front end 222 of the cylindrical wall 208 with the front end 231 of the windows 210 fit in one of the grooves 225 in the front end plate 209. A rear end 233 of the cylindrical wall 208 fits in one of the corresponding grooves 229 in the rear end plate 211. The cylindrical wall 208 can be secured to the end plates 209 and 211 by a tight fit in the grooves 225 and 229 or by other conventional means. A plurality of grooves 225 and 229 are provided in the front and rear end plates 209 and 211 so that alternate cylindrical walls, e.g., 208, 208' and 208", can be used corresponding in diameter to the diameter of the different grooves. The grooves 225 and 229 comprise means for holding at least an alternate drum having a cylindrical wall with a different circumference than the first drum. The alternate cylindrical walls can have a different number of windows 210 than the first cylindrical wall 208, windows 210 of different shapes or sizes or in different positions than each of the other cylindrical walls 208.

In the preferred embodiment, the reflector 212 is cone shaped, symmetric about an axis and positioned substantially inside the cylindrical wall 208 with its apex 235 pointing through the hole 221 in the front end plate 209 such that portions of a beam 237 directed through the hole 221 onto the reflector 212 will be reflected by the cone shaped reflector 212 and pass through each of the windows 210. The reflector 212 can be mounted to the rear end plate 211 with means 239 for adjusting the orientation of the reflector 212 with respect to the drum or the rear end plate 211. For instance, the reflector 212 can have a mounting portion 241 on a side 243 opposite its apex 235. The mounting portion 241 can have a surface 245 with a spherical indentation 247. A support 249 is mounted to the rear end plate 211 and optionally also to a flange 251 of the shaft 226 by a plurality of bolts 253, such as three. The support 249 has a surface 255 with a similar spherical indentation 257. A ball or sphere 259 is positioned in the spherical indentations 247 and 257. A plurality of bolts 261 positioned around the ball 259 connect the support 249 to the mounting portion 241 such that the orientation of the reflector 212 with respect to the rear end plate 212 can be adjusted by the bolts.

As in the first embodiment, any means 204 can be used for rotating the drum assembly 202. FIG. 2 illustrates the use of a variable speed motor 263 connected by a first shaft 265 rotatable by the motor 263 to a gear reducer mechanism 267. The gear reducer mechanism 267 is connected by a second shaft 226 to the drum assembly 202 and reduces the rotational velocity of the second shaft 226 with respect to the first shaft 265.

In operation, the apparatus 200 for making transmission holograms can be used as follows.

Figure 4:
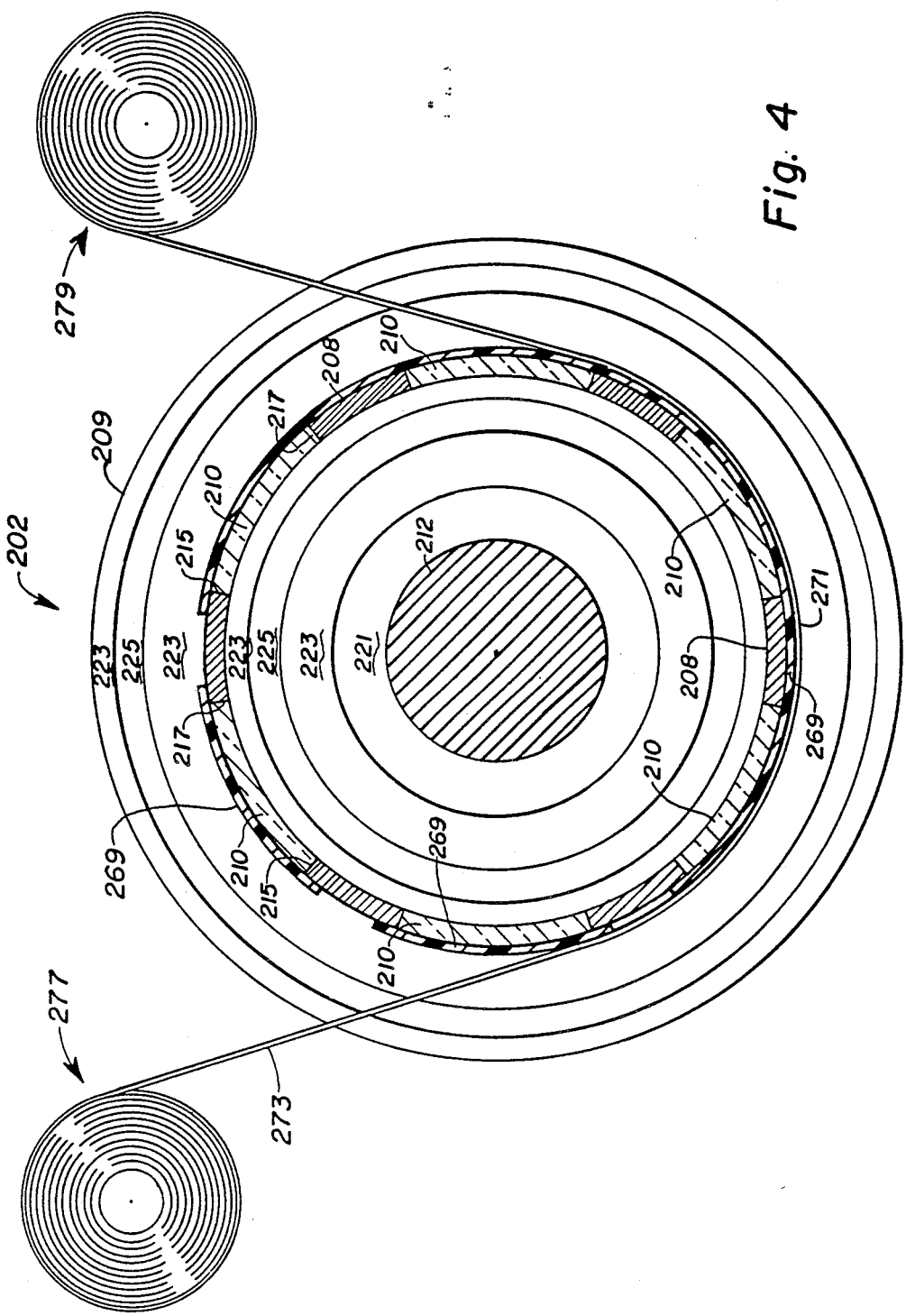
FIG. 4 depicts one arrangement for feeding a film of recording medium to and from the drum assembly of FIG. 3 taken along section lines 4—4 therein and looking in the direction of the arrows.
Figure 5:
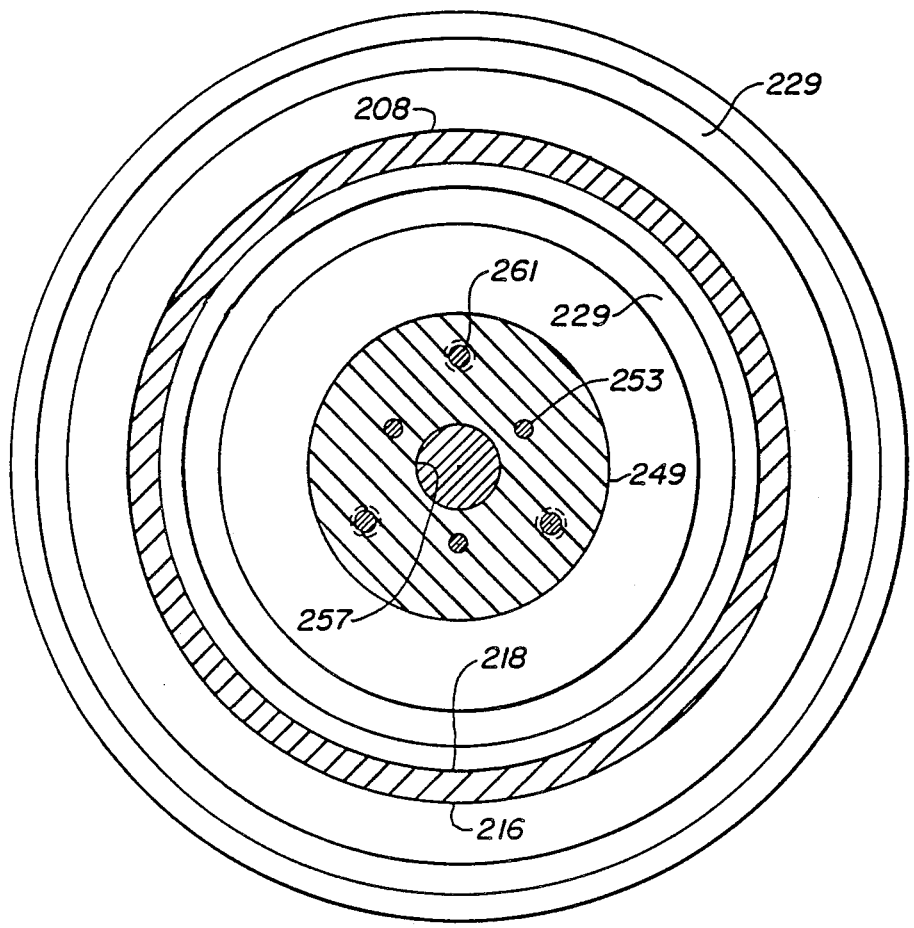
FIG. 5 is a cross sectional view of the drum assembly of FIG. 3 taken along section lines 5—5 therein and looking in the direction of the arrows.

First, referring to FIG. 4, a master 269 is secured near at least one of the windows 210. The master can be placed on either side of the window, either inside or outside the drum assembly. The master can be as described in relation to the apparatus 100. To repeat, the master 269 can be in the shape of a flexible film affixed to the cylindrical wall 208 on either side of the window 210, such as by tape. The master 269 must be made of at least a partially transparent material. Preferably, the master 269 comprises a transmission hologram.

Second, a portion 271 of a holographic recording medium 273 is positioned partially around the cylindrical wall 208. The recording medium 273 used herein can be a film as described in relation to the operation of the apparatus 100. The holographic recording medium 273 may be supplied from a first supply roll 277 for storing an unexposed portion of the recording medium 273 wound around the first roll 277. A second windup roll 279 may be provided for receiving an exposed portion of the recording medium 273 wound around the second roll 279. The drum assembly 202 can be designed to rotate in either direction. Thus, the position of the rolls 277 and 279 in FIG. 4 is only illustrative.

Third, the rotating means 204 rotates the drum assembly 202 about its longitudinal axis while transporting the recording medium portion 271 such that as the drum assembly 202 rotates the recording medium 273 is in non-sliding relationship with the master 269 and covers the master 269 or window 210 once the revolution of the drum assembly 202. Stated another way, the rotating means 204 transports unexposed recording medium 273 from the first roll 277 around part of the cylindrical wall 208 where the recording medium 271 can be exposed through the window 210 and then transports the recording medium 273 to the second roll 279.

Fourth, a beam 237 of actinic radiation is directed through the hole 221 of the front end plate 209 substantially along the longitudinal axis of the wall 208 towards the reflector 212 to reflect at least a portion of the beam 237 through the window 210, the master 269 and the recording medium 273 once each revolution of the drum assembly 202 to expose the recording medium 273, a source 275 for emitting the beam 237 preferably emits a beam 237 of substantially monochromatic actinic radiation, such as a laser 275. Preferably, the laser 275 emits a beam 237 of light having a circular cross section that is substantially collimated, coherent, monochromatic and polarized. The choice of laser depends on the wavelength to which the recording medium has been sensitized.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for use in making transmission holograms comprising:
   a first drum comprising a cylindrical wall having a longitudinal axis, an open end, a second end and a first window;
   means positioned inside the drum for reflecting a beam of actinic radiation that is directed into the drum through the open end to pass the beam through the window;
   a master positioned near the window; and
   a holographic recording medium positioned in fixed relation with respect to the master such that the beam reflected by the reflecting means passes through the master and then the recording medium.

2. The apparatus of claim 1, further comprising:

means for directing at least a substantially collimated, coherent, monochromatic, polarized beam of actinic radiation into the open end of the drum onto the reflecting means.

3. The apparatus of claim 1, wherein:
the master comprises a transmission hologram.

4. The apparatus of claim 1, wherein:
the recording medium comprises a silver halide emulsion or a film made of a photohardenable composition.

5. The apparatus of claim 1, wherein:
the cylindrical wall has a plurality of windows positioned on a circular line about the cylindrical wall;
the reflecting means comprises a conical reflector having an apex, the reflector being symmetric about an axis with the apex pointing through the open end such that portions of the beam will pass through each of the windows.

6. The apparatus of claim 5, further comprising:
a plurality of masters, one of the masters near each of the windows; and
the recording medium is positioned in fixed relation with respect to each of the masters such that the beam reflected by the reflecting means passes through the masters and then the recording medium.

7. The apparatus of claim 6, wherein:
at least one of the masters is positioned near one of the windows inside the drum.

8. The apparatus of claim 6, wherein:
at least one of the masters is positioned near one of the windows outside the drum.

9. The apparatus of claim 1, further comprising:
means for rotating the drum about the cylindrical wall longitudinal axis;
a first supply roll for storing an unexposed portion of the recording medium wound around the first roll; and
a second windup roll for receiving an exposed portion of the recording medium wound around the second roll,
whereby the rotating means transports unexposed recording medium from the first roll around part of the cylindrical wall where the recording medium can be exposed through the window and then transports the recording medium to the second roll.

10. The apparatus of claim 1, further comprising:
means for adjusting the orientation of the reflecting means with respect to the drum.

11. The apparatus of claim 1, further comprising
means for holding at least an alternate drum having a cylindrical wall with a different circumference than the first drum.

12. A method of making transmission holograms comprising the steps of:
securing a master near a window in a cylindrical wall of a drum;
positioning a portion of a holographic recording medium partially around the cylindrical wall;
rotating the cylindrical wall about a longitudinal axis while transporting the recording medium such that as the window rotates the master comes in non sliding contact with the recording medium; and
directing a reference beam of actinic radiation towards a reflector at least partially inside the drum to reflect at least a portion of the beam through the window and the master to expose the recording medium.

* * * * *